April 10, 1962 H. H. TUTTLE 3,028,837
SPAWN TRAY ASSEMBLY
Filed March 30, 1960 2 Sheets-Sheet 1
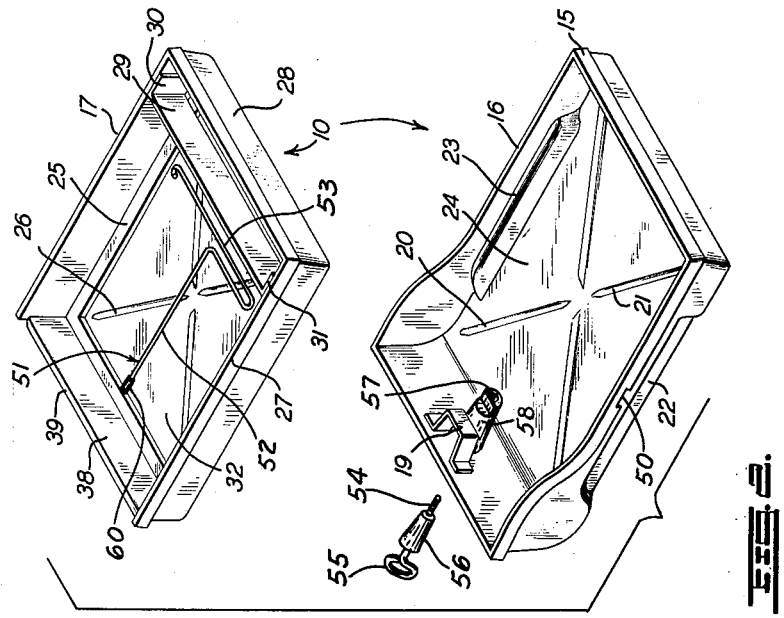
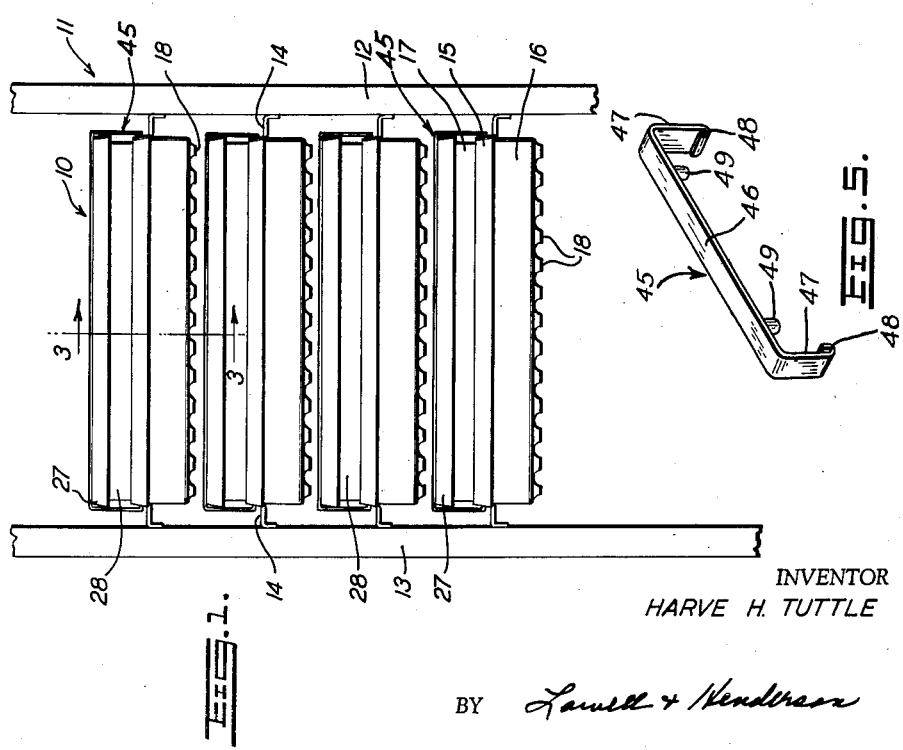
INVENTOR
HARVE H. TUTTLE
BY Lowell & Henderson
ATTORNEY

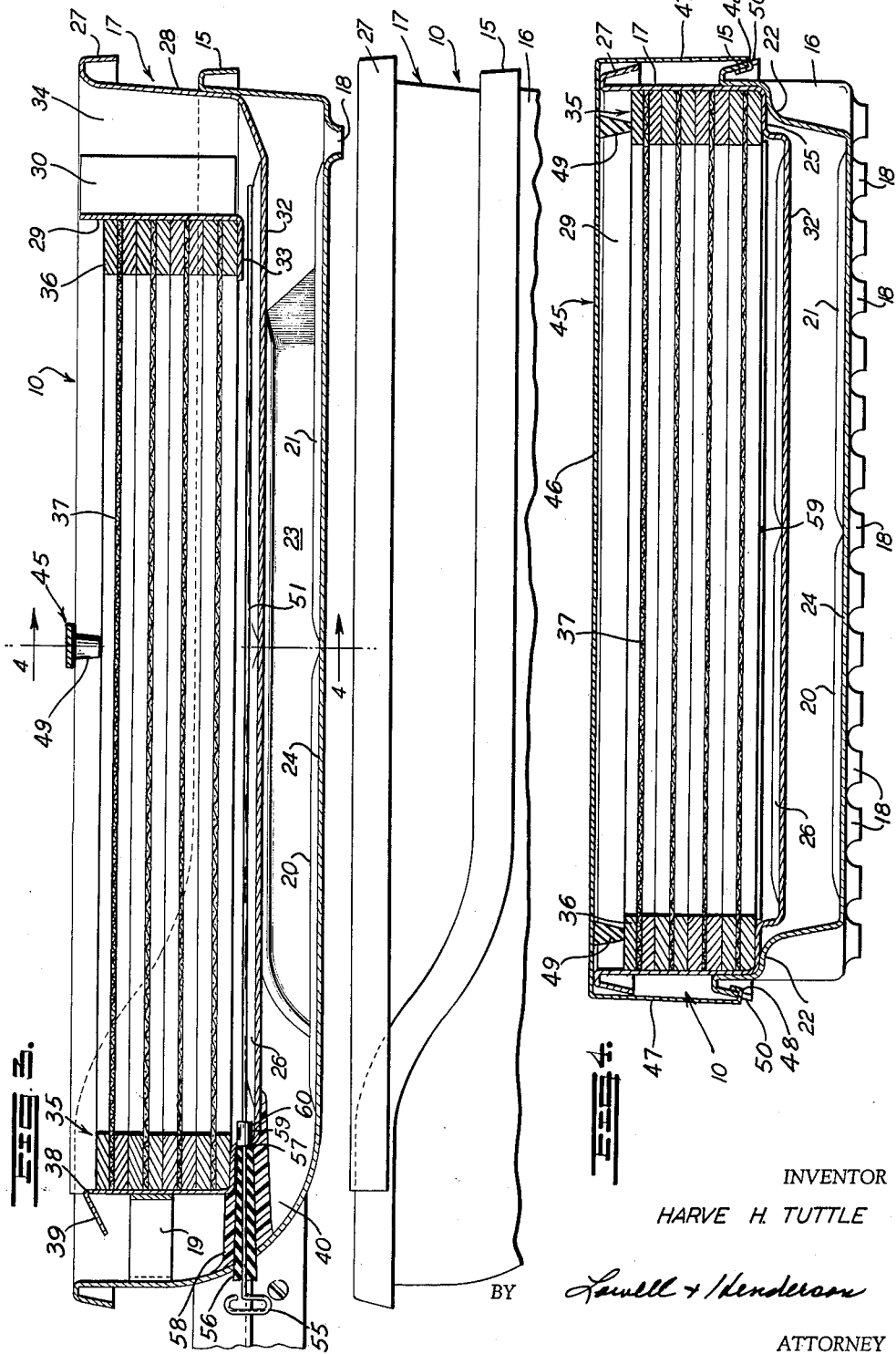

United States Patent Office 3,028,837
Patented Apr. 10, 1962

3,028,837
SPAWN TRAY ASSEMBLY
Harve H. Tuttle, 1226 Warren Place, Seattle, Wash.
Filed Mar. 30, 1960, Ser. No. 18,718
12 Claims. (Cl. 119—3)

This invention relates to the hatching of fish spawn generally and more specifically to a spawn tray assembly of an improved character for use in fish hatcheries.

The primary object of this invention is to provide an improved fish spawn hatcher assembly, which is readily adaptable to large scale hatchery operation, wherein the efficiency and production output from such equipment will be improved.

A more specific object of this invention is to provide a fish spawn hatcher assembly including a pair of nested tray members wherein a controlled water flow may be had through the assembly to provide for a more efficient spawn hatching operation.

Another object of this invention is to provide a fish spawn hatcher assembly including a pair of nested tray members with the assembly being suitable for stacking on a supporting rack whereby to provide for the continuous flow of water from one assembly through the other in a controlled manner.

A further object of this invention is to provide a fish spawn hatcher assembly including a pair of nested tray members wherein the inner of the tray members is adapted to receive a plurality of spawn screens of the usual type and wherein the water flow through the spawn screens from the inner of said tray members into the outer or lower of the tray members is controlled in such a manner as to equalize the temperature conditions around said spawn screens.

A still further object of this invention is to provide an improved fish spawn hatcher assembly including a pair of tray members with an upper member being nested in a lower member and the upper tray member being provided with water inlet means characterized by such a structure as to divert water from the inlet to the bottom of the pan, and thence through a series of spawn screens carried by the tray prior to an overflow into the lower of the trays, from whence it is then directed rearwardly along the bottom of the upper pan to an outlet in substantial alignment with the inlet of the upper pan to modify or control the water temperature while maintaining a continuous circulation of water through a plurality of spawn screens carried by the upper pan.

A further object of the invention is to provide a fish spawn hatcher assembly including a pair of nested tray members with each member being a generally unitary construction of plastic material which when in nested position, will provide for a continuous and reversing control of water flow from the inlet of the upper pan to the outlet of the lower pan whereby spawn screens positioned in the upper pan will be subjected to an up flow of continuously flowing water under modified temperature conditions.

A still further object of this invention is to provide a fish spawn hatcher assembly comprising a plurality of tray members, at least one member being nested within another in spaced relationship thereto, whereby to establish a flow passage for water between the tray members so that spawn screens positioned in the upper of the members may be treated with a continuously flowing supply of fresh aerated water under modified temperature conditions.

Another object of this invention is to provide a fish spawn hatcher assembly arrangement wherein a plurality of the assemblies are set up on a support rack in a stacked and somewhat spaced relationship one above the other so that the introduction of water into the uppermost assembly will be followed by a continuous and reversing flow of aerated water through the assemblies from the uppermost assembly to the lowermost assembly on the rack.

A still further object of this invention is to provide a fish spawn hatcher assembly arrangement wherein a rack is provided to stack a plurality of the hatcher assemblies one above the other in spacial relationship with the hatcher assemblies each including a pair of nested and spaced trays so that the introduction of water into the uppermost of the stacked assemblies will result in a continuous water flow with reversing characteristics between the various assemblies from the uppermost of the assemblies to the lowermost of the assemblies so that aerated water is supplied to all of the assemblies.

A more specific object of this invention is to provide a fish spawn hatcher assembly including a pair of nesting tray members with the upper of the tray members being adapted to support therein in spaced relationship to the bottom portion a plurality of spawn screens and the said tray members being spaced from each other in such a manner as to provide a channel for the flow of water between the bottom walls thereof, and the trays being further designed to receive water in the upper tray at one end thereof and the lower tray being designed for the outflow of water at a location substantially aligned with the inlet of the upper tray, the water progressing through the tray assembly from the inlet of the upper tray downwardly, then upwardly through the spawn screens then downwardly over one end of the upper tray along the bottom of the lower tray to the outlet of the lower tray, whereby a modified temperature control of the flowing water is attained.

With the foregoing and other objects in mind the invention resides in the following specification and appended claims, certain embodiments and details of construction of which are illustrated in the accompanying drawings, in which:

FIGURE 1 is a view in front elevation of the invention illustrated in a stacked arrangement on suitable racks, shown in fragmentary form;

FIGURE 2 is an exploded view of the tray assembly comprising the invention;

FIGURE 3 is a sectioned view taken along the lines 3—3 of FIGURE 1;

FIGURE 4 is a sectioned view taken along the lines 4—4 of FIGURE 3; and

FIGURE 5 is a perspective view of a locking member for holding spawn screens in a tray assembly against relative movement.

Referring now more particularly to FIGURE 1 the invention comprising a tray assembly generally indicated at 10 is shown as being supported on a rack structure 11 in stacked relationship with a plurality of other spawn tray assemblies. The rack structure comprises a pair of upright members 12, 13 to which suitable mounting brackets 14 are secured, as by welding. The brackets 14 engage under a lip 15 depending about the upper periphery of the lower tray member 16 of a tray assembly 10. Nested within the lower tray 16 is an upper tray 17. As illustrated in FIGURE 1, the trays are positioned directly above each other in a somewhat spaced relationship whereby to provide for the continuous non-spilling flow of water from the uppermost tray assembly as illustrated in FIGURE 1 to the lowermost tray assembly. For example, when water is introduced into the upper tray as will hereinafter be explained, it will flow through the tray assembly and eventually will discharge from the outlets 18 which are integral with the bottom wall tray member 16. By mounting the tray assemblies in a spaced relationship as illustrated, a certain amount of aeration of the water takes place in falling from one tray to the next, thereby entraining a small amount of oxygen to make up for that lost going through a tray assembly.

Referring to FIGURE 2 it will be noted that the lower tray is formed substantially from a single sheet of molded plastic material. Only the support bracket 19 is formed from a separate piece of plastic which bracket is attached to the inner wall of tray 16 as by a plastic bond. The lower tray member is provided with ribs 20 and 21 to add strength to the bottom area of the pan. The lower tray member is also provided with offset inwardly directed recesses 22 which on the inner side of the tray provide ledges 23 whereby to support the upper tray member 17 somewhat above the upper surface 24 of the bottom wall of the tray. The upper tray member 17 is likewise substantially a one piece member formed with an integral bottom ledge area 25, strengthening rib 26 and a downwardly directed peripheral skirt 27. Adjacent to but spaced from the end wall 28 of tray 17 is a partition 29 which has right angle flanges 30 and 31 suitably secured as by a plastic bond to the side walls of the tray member 17. The partition 29, as is better illustrated in FIGURE 3, is spaced substantially at its lower end above the upper surface of the bottom wall 32 in FIGURE 2, and is provided with an inwardly directed offset supporting flange 33. By spacing the partition 29 as illustrated an inlet 34 for water into the upper tray area is provided. Water received in inlet 34 will flow beneath the partition 29 and under the inwardly directed flange 33 along the surface area 32 of the tray member.

As illustrated in FIGURES 3 and 4 there is supported between the ledge member 25 of the tray 17 and flange member 33 of the partition 29, a plurality of spawn screens 35. Each screen 35 includes a frame member 36 to which is attached a fine mesh screen 37 upon which, when in use, are evenly distributed a plurality of fish eggs to be hatched under the influence of free circulating water. The end wall 38 of the tray 17 is of reduced height relative to the wall 28 and the partition 29, and is provided with an outwardly directed lip 39 whereby to provide a weir over which water may discharge into the lower tray 16.

It will be obvious, therefore, that by the present arrangement, water introduced into the inlet 34 of the tray 17 will flow beneath the partition 29, along the surface 32 of the tray 17, upwardly through the screens 37, and outwardly over the weir 38 and lip 39 to discharge into the end area 40 of lower tray 16. From the area 40 of tray 16 the water will be reversed in direction to that along the upper tray wall 32 and will move toward the outlet 18. Thus it will be seen that in the flow of water through the tray assembly 10, the water first flows downwardly and laterally, then upwardly and again downwardly, and then reverses itself in the lateral direction as viewed in FIGURE 3 back to an outlet 18 which is substantially directly below the inlet 34 of the upper tray member 17. In causing the water to flow in this manner, substantial equalization of water temperatures between inlets and outlets of the tray assemblies is achieved by means of a thermal exchange through the bottom wall 32 of the upper tray. In other words, if the outlet water has a tendency to be somewhat warmer than the inlet water, then the inlet water will be warmed by the outlet water through the bottom wall of tray 17.

Now referring back to FIGURE 1 as well as with reference to FIGURE 4, it will be noted that a plurality of outlets 18 are illustrated. The purpose of utilizing a plurality of such outlets is to assist in breaking up the water discharge from the lower tray 16 to provide for a more efficient aeration of the water in its gravity fall from one tray assembly to the next as illustrated in FIGURE 1, thereby allowing the water to entrain a certain amount of additional oxygen before running its reversing cycle through the next succeeding lower tray assembly, to assist in speeding up the hatching of spawn on screens 37.

In use, and due to the upward flow of water through a tray assembly 10, there is a tendency of the screens 35 to float or move vertically relative to each other. Since a separation of the screens 35 may result in a release of eggs or spawn from between the screens there is provided a resilient locking member 45 (FIGURE 5) of a substantially U-shape having an elongated base section 46 and legs 47 terminating in bent-in hooks 48. Spaced longitudinally of the base section 46 are a pair of abutment or stop members 49.

With the tray members 16 and 17 in assembly relation and with the screens 35 positioned within the tray member 17, the locking member 45 which is formed of a plastic material, is arranged with the base section 46 extended transversely across the tray member 17 and its legs 47 extended downwardly and to the outside of the tray member 17, as shown in FIGURE 4. The hooks 48 are received within notches 50, formed in the lip 15 of the lower tray member 16, and are engageable with the lip so as to releasably lock the tray members 16 and 17 against separation, with this locking engagement of the hooks 48 with the lip 15 being achieved by the resiliency in the locking member 45.

When the member 45 is thus arranged the abutment or stop members 49 are in contact engagement with transversely opposite portions of the upper screen 35 in a tray assembly 10, whereby the screens 35 are held together against the ledge 25 against upward separating movement.

For the purpose of removing any sediment which might settle at the bottom of the upper tray member 17, there is provided a clean out member 51 (FIGURE 3) extended longitudinally along the bottom of the tray member 17. The member 51 includes a handle section 52 (FIGURE 2) integrally formed at one end with a transversely extended cross arm or sweep 53. The section 52 is releasably coupled at 60 with the stem 54 of a hand grip 55, a tapered plug 56 being mounted on the stem for closing a clean out bore 57 (FIGURE 3) formed in a boss 58 secured to the lower tray member 16 at a position below the bracket 19 and opposite the bottom 32 of the upper tray member 17. The bore 57 is in alignment with an opening 59 formed in the bottom 32.

When sediment is to be removed from the tray member 17, the hand grip 55 is pulled outwardly to remove the plug 56 from the clean out bore 57, after which the member 51 is manually reciprocated longitudinally of the tray member 17. This reciprocating movement provides for the stirring and sweeping of the sediment by the cross arm 53 for removal by the water flowing outwardly of the tray assembly 10 through the clean out bore 57. On completion of this cleaning operation the plug 56 is reinserted within the clean out bore.

In the assembly of the tray members 16 and 17 the handle section 52 and cross arm 53 are positioned in the bottom of the upper tray 17 as illustrated in FIGURE 2, and the hand grip 55, stem 54 and plug 56 are carried on the lower tray member 16. On placement of the tray member 17 within the tray member 16, the stem 54 and handle section 52 are coupled at 60, after which the screens 35 are positioned within the tray member 17.

Although the invention has been described with respect to a preferred embodiment of the invention it is to be understood that it is not so limited since changes and modifications can be made therein within the full intended scope of the invention as defined by the appended claims.

I claim:

1. A fish spawn hatcher assembly comprising a pair of tray members with bottom, side and end walls, one of said tray members being received in nested relationship within the other said tray member, the nested relationship being such as to provide a space between the bottom wall of the upper tray and the bottom wall of the lower tray as well as between one pair of end walls thereof, inlet means for receiving water adjacent the nonspaced end wall of said upper tray and for directing the water toward the bottom wall thereof, means to admit water from the inlet means to the surface area of the bottom wall to said upper tray, outlet means in the spaced end wall of said upper tray at a level below the inlet means of said tray, and outlet means integral with the bottom portion of the lower tray whereby to form a continuous flow path through said trays from the inlet means of said upper tray to the outlet means of said lower tray.

2. A fish spawn hatcher assembly comprising a pair of nested trays, each said tray including side, end and bottom wall members, inlet means for water at one end of said upper tray, restricted inlet means adjacent to the upper surface of the bottom wall of the upper tray from said inlet means, outlet means comprising a reduced height end wall at the other end of the tray from said inlet means, the end wall being spaced from the adjacent end wall of the lower tray, whereby to permit water from the upper tray to flow into the bottom tray, and outlet means in the bottom wall of said bottom tray, said outlet means being positioned substantially directly below the inlet means of said upper tray.

3. A fish spawn hatcher assembly comprising an upper tray, a lower tray, cooperative supporting means on each said tray member whereby said lower tray supports said upper tray therein in a spaced, nested relationship, so that one end wall and the bottom wall of said top tray are spaced from the adjacent surfaces of said lower tray, inlet means in said upper tray at the end thereof not spaced from the end wall of the bottom tray, outlet means comprising a weir at the other end of said upper tray, and outlet means integral with said bottom tray and positioned substantially directly below the inlet means of said upper tray.

4. A fish spawn hatcher assembly comprising a pair of nested tray members, with certain of the wall surfaces of said members being supported in spaced relationship when in a nested condition, restrictor plate means integral with the upper tray member and being spaced from one end wall thereof and from the bottom wall thereof whereby to form a water inlet for said upper tray for directing water inwardly, downwardly and lengthwise of said tray, outlet means for said upper tray comprising a reduced height end wall opposite said inlet means whereby to establish a weir for directing water from the upper tray into the spaced area between the walls of said tray members, and an outlet from said bottom tray, said outlet being positioned substantially directly below the inlet means of the upper tray.

5. A fish spawn hatcher assembly and rack arrangement comprising a plurality of tray members, said tray members being nested together in pairs so that a substantial spacing exists between certain walls thereof, each said pair of tray members including inlet means in the upper tray thereof, means to direct water from the upper tray to the lower tray, said means being oppositely disposed to the inlet means of said upper tray, outlet means for said lower tray positioned substantially directly below the inlet means for the upper tray, and rack means to support a plurality of tray pairs in stacked relationship so that water introduced into the inlet of an upper tray will flow from the inlet to the outlet of the lower tray and thence to the inlet of the next succeeding pair of tray members in said stacked assembly.

6. A fish spawn hatcher assembly arrangement comprising a supporting rack frame including supports for a plurality of tray assemblies in stacked relationship, a tray assembly received on each said support of the rack, said tray assemblies comprising a pair of nested tray members wherein the upper of said tray members is supported in the lower said tray member in spaced wall relationship thereto, inlet means for receiving water in the upper tray at one end thereof, means to direct water from the inlet means in said upper tray to the bottom surface area thereof, weir means constituting a portion of the other end wall of said upper tray for dispensing water from said upper tray into the spaced area between the walls of the upper and lower trays, and outlet means integral with the bottom wall of said lower tray of said assembly and positioned substantially directly below the inlet of said upper tray, whereby when said assemblies are arranged in stacked relationship on said rack frame, there will be a continuous periodic reversing flow of water from the inlet means of the uppermost tray to the outlet means of the lowermost tray.

7. A fish spawn hatcher assembly arrangement comprising a rack frame, means for supporting a plurality of spawn tray assemblies in stacked relationship on said rack frame, each tray assembly including an upper portion and a lower portion separated by a partition whereby a space is formed therebetween, inlet means formed in said tray assembly at one end thereof for receiving water and directing it along the bottom of said upper portion, weir means at the other end of said tray assembly for directing water at a certain height above said bottom into said space, said lower portion having an outlet formed therein for discharging water by gravity from said tray assembly, said plurality of tray assemblies being vertically spaced with each outlet of one tray assembly positioned over an inlet means of the next lower tray assembly, and with an air gap between each said outlet and the inlet means of said next lower tray assembly whereby the water is aerated as it passes therebetween.

8. A fish spawn hatcher assembly comprising a pair of tray members, said tray members being capable of nesting whereby the upper of said trays is partially supported within the confines of the lower of said trays but in a spaced relationship to the bottom wall thereof, means to receive water at one end of said upper tray, means to direct water along the inner surface of the bottom wall of said upper tray, means to direct water outwardly of said upper tray over one end wall thereof into the spaced area between said trays, and outlet means for said lower tray positioned below the receiving means of said upper tray whereby water flowing through said trays from the receiving means of the upper tray to the outlet of the lower tray will be in heat exchange relationship with itself through the bottom wall and end walls of said upper tray whereby to assist in stabilizing the temperature of the water at all points within said assembly.

9. The invention according to claim 1 wherein a support means is provided to carry a spawn screen in spaced relationship to the bottom wall of the upper tray member.

10. The invention according to claim 3 wherein a support means is provided to carry a spawn screen in spaced relationship to the bottom wall of the upper tray member.

11. The invention according to claim 4 wherein a support means is provided to carry a spawn screen in spaced relationship to the bottom wall of the upper tray member.

12. A fish spawn hatcher assembly comprising a pair of nested tray members, with certain of the wall surfaces of said members being supported in spaced relationship when in a nested condition, restrictor plate means integral with the upper tray member and being spaced from one end wall and from the bottom wall thereof to form a water inlet for said upper tray for directing water inwardly, downwardly and lengthwise, of said tray, supporting means integral with the upper tray for carrying a spawn screen between the restrictor plate and the other end wall in spaced relationship to the bottom wall of the tray member, outlet means for said upper tray comprising a reduced height end wall opposite said inlet means whereby to establish a weir for directing water from the upper tray above the spawn screen supporting means into the spaced area between the walls of the tray members, and an outlet from said bottom tray, said outlet being positioned substantially directly below the inlet means of the upper tray member.

References Cited in the file of this patent
UNITED STATES PATENTS

| | | |
|---|---|---|
| 173,262 | Brackett | Feb. 8, 1876 |
| 680,838 | Bourgeous | Aug. 20, 1901 |
| 1,007,383 | Parry | Oct. 31, 1911 |